(12) United States Patent
Ashcraft et al.

(10) Patent No.: US 8,705,229 B2
(45) Date of Patent: Apr. 22, 2014

(54) FOLDABLE ELECTRONIC DEVICES INCLUDING A FIRST AND A SECOND MAGNET

(75) Inventors: Britt C. Ashcraft, Tomball, TX (US); Ki Bok Song, Katy, TX (US); Eric Chen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 13/455,341

(22) Filed: Apr. 25, 2012

(65) Prior Publication Data

US 2013/0286551 A1 Oct. 31, 2013

(51) Int. Cl.
*G06F 1/16* (2006.01)
(52) U.S. Cl.
USPC ............. 361/679.27; 361/144; 361/679.26; 312/223.1; 312/223.2

(58) Field of Classification Search
USPC ..................................... 361/679.58
See application file for complete search history.

(56) References Cited

U.S. PATENT DOCUMENTS

| | | | |
|---|---|---|---|
| 6,366,440 B1 * | 4/2002 | Kung | 361/147 |
| 6,653,919 B2 * | 11/2003 | Shih-Chung et al. | 335/207 |
| 6,929,291 B2 * | 8/2005 | Chen | 292/251.5 |
| 7,583,500 B2 * | 9/2009 | Ligtenberg et al. | 361/679.27 |
| 2007/0133156 A1 * | 6/2007 | Ligtenberg et al. | 361/681 |
| 2008/0278269 A1 | 11/2008 | Ramirez et al. | |
| 2009/0103261 A1 * | 4/2009 | Shih | 361/679.58 |

* cited by examiner

*Primary Examiner* — Anthony Q Edwards

(57) ABSTRACT

Foldable electronic devices including a first and a second magnet. An example foldable electronic device includes a base, a cover, a hinge pivotally connecting the base and the cover to fold the device into a closed position, a first magnet in the base, and a second magnet in the cover to repel the first magnet to separate the base and the cover when the device is resting in the closed position.

17 Claims, 3 Drawing Sheets

FIG. 7

```
BEGIN
  ↓
[400] MAINTAIN A GAP BETWEEN A TOP AND A BASE OF A FOLDABLE ELECTRONIC DEVICE RESTING IN A CLOSED POSITION
  ↓
END
```

FIG. 8

```
BEGIN
  ↓
[500] SELECT A PAIR OF MAGNETS TO CREATE GAP BETWEEN TOP AND BASE
  ↓
[502] INSERT AND ARRANGE THE PAIR OF MAGNETS IN THE TOP AND BASE
  ↓
[504] CONNECT BASE AND TOP VIA HINGE
  ↓
[506] ADDITIONAL PAIRS OF MAGNETS SELECTED?
  — YES → [508] INSERT AND ARRANGE ADDITIONAL PAIRS OF MAGNETS IN THE TOP AND BASE → END
  — NO → END
```

FOLDABLE ELECTRONIC DEVICES INCLUDING A FIRST AND A SECOND MAGNET

BACKGROUND

Portable electronic devices (for example, laptop computers, cell phones, handheld video games, cameras, etc.) are widely used throughout society for a variety of purposes. Such devices come in many shapes and designs to suit individual user preferences and/or needs. A design feature among many portable electronic devices includes a hinge to fold and/or close the device in half like a clamshell when not in use. Such a folding approach enables users to reduce the size of their devices when not in use, and can also protect components within the device such as a keyboard and/or a display screen.

BRIEF DESCRIPTION OF THE DRAWINGS

FIG. 7 is a flowchart representing a method implemented by the example portable electronic devices of FIGS. 1-6.

FIG. 8 is a flowchart representing a method to manufacture the example portable electronic devices of FIGS. 1-6.

DETAILED DESCRIPTION

Many prior portable electronic devices include a housing including base and a top, cover, or lid pivotally connected to the base via one or more hinges to enable the device to be folded from an opened position to a closed position in a clamshell-like configuration. Many such prior portable devices contain one or more user interfaces such as a keyboard or a display.

When in a closed position, the top of such devices serve as a cover to enclose the keyboard and/or the display (for example, a display in the top faces a keyboard in the base when the top is closed adjacent the base). However, with the top folded against the base, there is a risk that the keyboard and the display will bump, resulting in the potential for scratches, marks and/or other damage to the keyboard, the display, or other abutting structures. To alleviate this concern, prior electronic devices have employed one or more rubber bumpers to maintain a gap, space, or buffer between the base and the top when the devices are closed.

Figure 1:
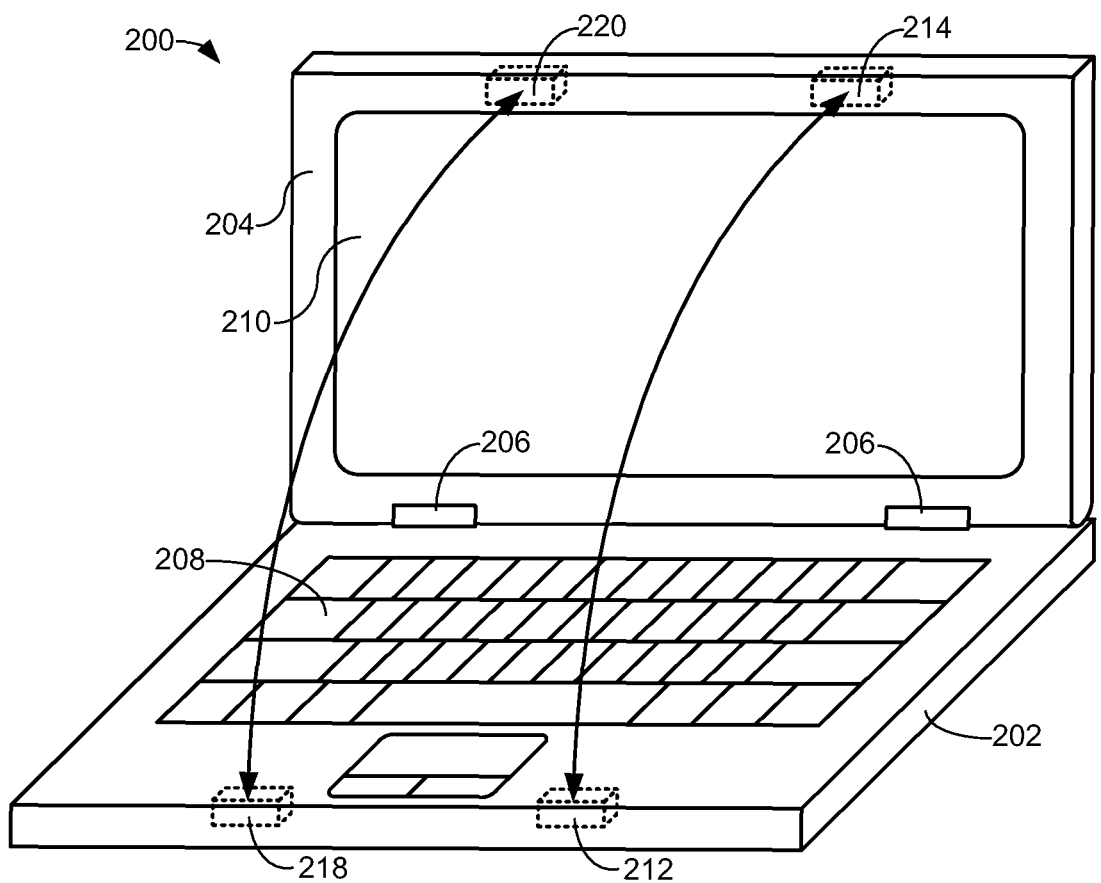
FIG. 1 is a right, front perspective view of an example portable electronic device constructed in accordance with the teachings of this disclosure and shown in an open position.
Figure 2:
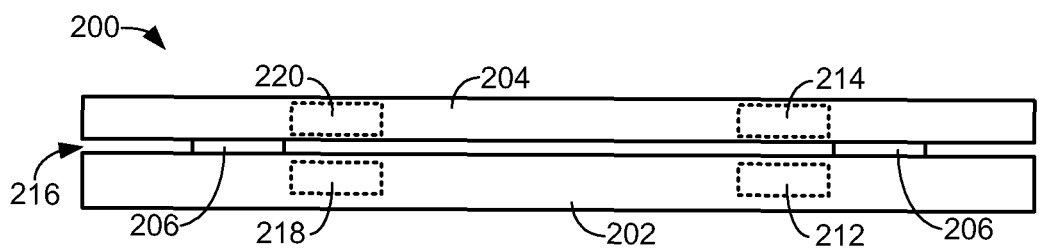
FIG. 2 is a front view of the example portable electronic device of FIG. 1 shown in a closed position.
Figure 3:
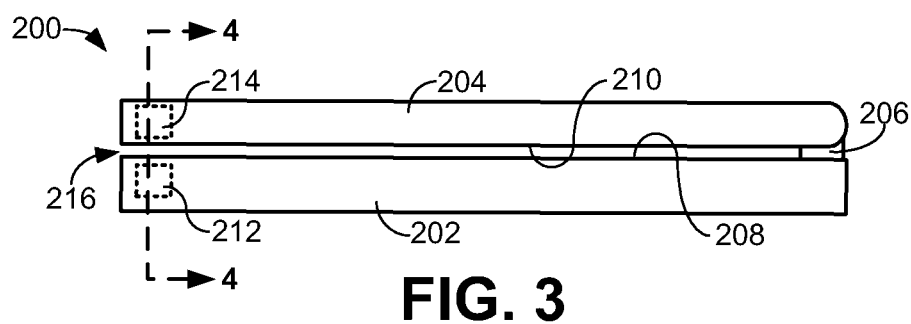
FIG. 3 is a right side view of the example portable electronic device of FIG. 1 shown in a closed position of FIG. 2.

FIG. 1 is a right, front perspective view of an example portable electronic device 200 shown in an open position. FIGS. 2 and 3 are respective front and side views of the example portable electronic device 200 of FIG. 1 shown in a closed position. Although illustrated as a laptop computer, the example device 200 may be implemented by any type(s) of portable electronic device(s) including, for instance, a laptop computer, a mobile phone, a handheld video game, a digital pocket dictionary/translator, a camera, or any other foldable device. In the illustrated example, the device 200 includes a clamshell-type housing including a base 202 and a top or cover 204 pivotally joined to the base 202 via one or more hinges 206. Furthermore, in the illustrated example, the base 202 includes a keyboard 208 and the top 204 includes a display 210.

For the purpose of reducing (for example, preventing) contact between components of the device carried in the top 204 of the housing and components of the device carried in the base 202 of the housing, the example device 200 of FIG. 1 is provided with pairs of repelling magnets. In the illustrated example, a first pair of magnets includes a first magnet 212 positioned in the base 202 and a second magnet 214 positioned in the top 204. In some examples, the magnets are permanent magnets. In other examples, the magnets 212, 214 are electromagnets. For example, the magnets 212, 214 may comprise electromagnetic coils that are powered from the same source that powers the keyboard 208, display 210, and/or other electrical components of the portable electronic device 200 (for example, a battery). In some examples, the magnets 212, 214 are fixed within the corresponding base 202 or top 204. The magnets 212, 214 in the illustrated example are positioned relative to one another in corresponding locations within the respective base 202 or top 204 such that when the device 200 is in a closed position the magnets 212, 214 are adjacent one another as shown in FIGS. 2 and 3. As a result, the magnetic fields produced by the magnets 212, 214 interact. Furthermore, the orientation and/or alignment of the first magnet 212 with respect to the second magnet 214 in the illustrated example is such that portions of the magnets 212, 214 having the same polarity face each other when the device 200 is in a closed position so as to create a repelling force between the magnets 212, 214. Example orientations and/or alignments of the magnets 212, 214 are described in greater detail below in connection with FIGS. 4-6.

In the illustrated example, because the magnets 212, 214 of the illustrated example are respectively fixed within the base 202 and top 204, the magnetic repulsive force between the magnets 212, 214 applies a rotational force or torque about the hinges 206 biasing the top 204 away from the base 202 and/or vice versa. The magnetic fields produced by the magnets 212, 214 of the illustrated example have sufficient strength to create a repelling force sufficient to lift the top 204 off of the base 202 when the device 200 is resting in a closed position to thereby create and maintain a gap or space 216 between the base 202 and the top 204. As a result, the use of rubber bumpers to prevent the top 204 from coming into contact with the base 202 is reduced or eliminated as will be discussed in greater detail below. In the illustrated example, the exact strength of the of the magnets 212, 214 used to establish the gap 216 may vary depending upon the size and construction of the device 200 as well as the placement of the magnets 212, 214 within the device as will be described in greater detail below.

In the illustrated example, the width of the gap 216 is relatively small compared with the size of the device 200 (for example, the width of the gap 216 is between about 0.5 mm and about 1 mm). As a result, the device 200 actually looks closed rather than ajar. The precise width of the gap 216 is achieved by establishing the proper strength(s) of the magnets 212, 214 to provide the necessary torque to rotate the top 204 about the hinges 206 by overcoming any opposing forces from the hinges 206 (for example, spring forces, friction forces, etc.) and the weight of the top 204 (for example, gravity). The proper strength(s) of the magnets 212, 214 is established by tuning the strength of the magnetic fields produced by the magnets 212, 214 in connection with several other factors such as: (1) the distance of the magnets 212, 214 from the hinges 206; (2) how close the magnets 212, 214 are to sit when the device 200 is in the closed position; (3) the alignment and/or orientation of the magnets 212, 214 with respect to each other; (4) the weight of the top 204; and (5) the force of resistance provided by the hinges 206.

How these factors are set depend upon the design constraints of the particular electronic device (for example, the device's form, function, material composition, etc.). For example, as shown in FIGS. 1-3, the magnets 212, 214 are disposed at edges of the base 202 and the top 204 located away from or distal the hinges 206. In this manner, a lower magnetic force is required to achieve the required amount of torque to overcome the opposing forces because of a greater lever arm measured by the distance between the hinges 206 and the magnets 212, 214. However, the magnets 212, 214 may be disposed in any suitable location within the base 202 and the top 204, and the strength of corresponding magnetic fields adjusted accordingly. Similarly, in the illustrated example, the magnets 212, 214 are placed internally within the base 202 and the top 204, which may appeal to the aesthetic preferences of a user of the device 200. However, in some examples, the magnets 212, 214 are exposed (for example, placed on the surface of the base 202 and top 204) thereby bringing the magnets 212, 214 closer together when the device 200 is closed and reducing the amount of magnetic strength of the magnets 212, 214 to achieve the gap 216. Example orientations and/or alignments of the magnets 212, 214 are discussed in greater detail below in connection with FIGS. 4-6.

In addition to the foregoing, the amount of strength of the magnets 212, 214 to achieve the gap 216 can be reduced if more than one pair of magnets is positioned within the device 200. To this end, in the illustrated example, a second pair of magnets 218, 220 are located in opposing locations within the base 202 and top 204 respectively. As a result, the total repelling force used to separate the top 204 from the base 202 is divided among the four magnets 212, 214, 218, 220 thereby resulting in a reduced amount of magnetic strength in any one pair of magnets to maintain the gap 216. Any suitable number of pairs of magnets may be implemented to achieve the desired magnetic force to maintain the gap 216 (or a gap of any desired dimension) when the top 204 is adjacent the base 202 when the device 200 is in a closed position (see, for example, FIGS. 2 and 3).

In some examples, the second pair of magnets 218, 220 are oriented and/or aligned with respect to each other such that portions of the magnets 218, 220 having opposite polarities are facing each other when the device 200 is in a closed position to create an attracting force therebetween. In such examples, the attracting force generated by the second pair of magnets is less than the repulsive force generated by the first pair of magnets such that the gap 216 is maintained. In some examples, one of the second pair of opposing magnets may produce its own magnetic field while the other magnet is merely composed of a material that becomes magnetic and is attracted to the first magnet of the pair when exposed to the magnetic field produced by the first magnet. In some such examples, the force of attraction serves to at least partially counteract the repelling force created by the first pair of magnets 212, 214. Such a counteracting force may be desirable where the repelling force is relatively strong and/or the opposing forces produced from the hinges 206 and/or the weight of the top 204 is relatively weak.

As mentioned previously, any of the foregoing examples disclosed herein enable a gap or space 216 to be maintained between the base 202 and the top 204 of the device 200 to reduce (for example, prevent) undesirable contact between the top 204 and the base 202. In this manner, the use of rubber bumpers is reduced or eliminated. By reducing the use of rubber bumpers, the number of parts for the example device 200 may be reduced compared with portable electronic devices without magnets and a user will not have to worry about replacing the bumpers if one of them should fall off. Furthermore, by reducing the use of rubber bumpers the design and/or external appearance may be simplified. Additionally, in the illustrated example shown in FIGS. 2 and 3, the gap 216 provides a 'floating effect' that offers a unique appearance in itself that may be desirable to users of the device 200. Further, in some examples, the width of the gap 216 is substantially uniform in cross-sectional planes between the base 202 and the top 204 parallel to the hinge as a result of the strengths and positions of the magnets 212, 214. In such an approach, a 'floating effect' is created in which the top 204 appears to hover over the base 202.

As used herein, the phrase 'resting in a closed position' or 'closed in a state of rest' refers to when the device 200 is closed and not subject to human intervention (for example, a user is not pushing the top 204 down, lifting the top 204 up, etc.) or subjected to objects placed on top of the device 200 or otherwise forcing the top 204 and base 202 together. Accordingly, in some examples, the device 200 may include some rubber bumpers to protect the keyboard 208 and the display 210 when the device is forced beyond the "resting in a closed position". However, in some examples, no rubber bumpers are included.

Figure 4:
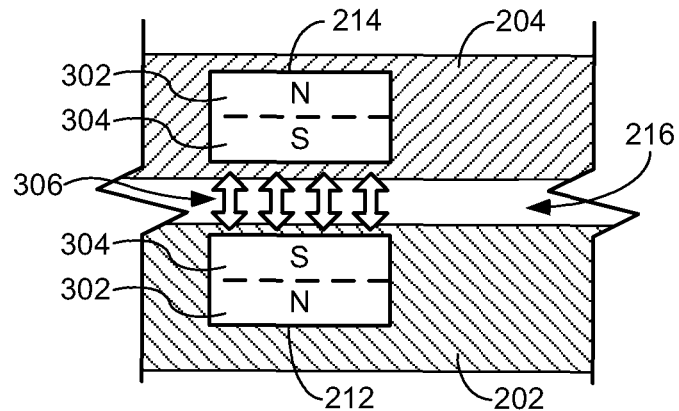
FIG. 4 is an enlarged cross-sectional view of the portable electronic device of FIG. 1 taken along line 4-4 of FIG. 3 and showing the magnets in a first example orientation.
Figure 5:
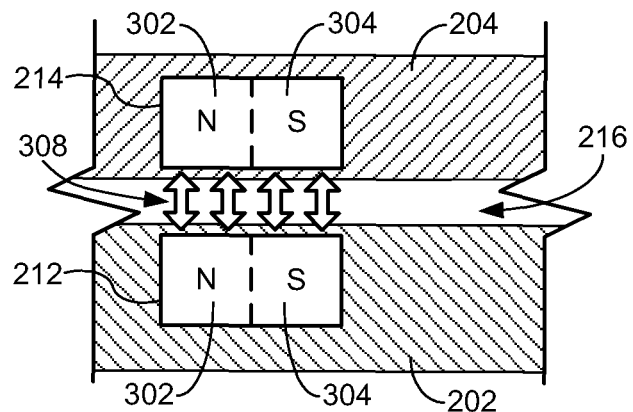
FIG. 5 is a view similar to FIG. 4, but showing the magnets in a second example orientation.
Figure 6:
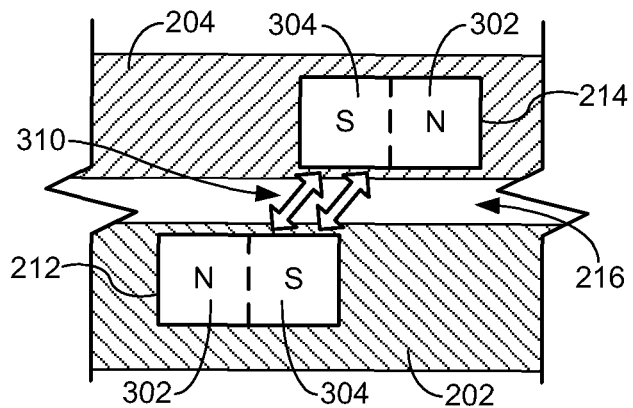
FIG. 6 is a view similar to FIG. 4, but showing the magnets in a third example orientation.

FIGS. 4-6 are cross-sectional views of the electronic device of FIG. 1 taken along lines 4-4 of FIG. 3 and showing alternative example orientations and alignments of the magnets 212, 214 in the base 202 and the top 204 when the device 200 is resting in a closed position. In the illustrated examples, each of the magnets 212, 214 includes a north pole 302 ("N") and a south pole 304 ("S"). As described previously, the magnets 212, 214 of the illustrated examples may be oriented and/or aligned such that the portions having the same polarity (for example, the north poles 302 or the south poles 304) are opposed to each other in facing relation.

In the illustrated example of FIG. 4, the north and south poles 302, 304 of the magnets 212, 214 are oriented substantially perpendicular to the planes of the base 202 and the top 204. In other examples, the magnets 212, 214 are oriented at oblique angles to the planes of the base 202 and the top 204. Additionally, in the illustrated example the same poles (for example, the south poles 304) are nearest each other. Furthermore, the magnets 212, 214 are aligned or juxtaposed when the clamshell-like housing is resting in the closed position such that the magnetic fields produced create a relatively high force of repulsion 306 to establish the gap 216 between the base 202 and the top 204.

In the illustrated example of FIG. 5, the north and south poles 302, 304 of the magnets 212, 214 are oriented to lie within respective planes of the base 202 and the top 204. The poles 302, 304 in FIG. 5 may lie parallel to the axis of the hinges 206 of the device, perpendicular to the axis of the hinges 206, or at any other suitable angle. Furthermore, as shown in the illustrated example, the magnets 212, 214 are aligned and both the north and south poles 302, 304 of the first magnet 212 are nearest the corresponding poles 302, 304 of the second magnet 214. In this manner, a combined magnetic repulsive force 308 (for example, one force for the opposed north magnets and another for the opposed south magnets) is created between the magnets 212, 214 to separate the top 202 from the base 202 thereby creating the gap 216.

In the illustrated example of FIG. 6, the north and south poles 302, 304 of the magnets 212, 214 are oriented in the same manner as illustrated in FIG. 5. However, in the example of FIG. 6, only one of the same poles (for example, the south poles 304) of the magnets (for example, 212, 214) are opposed. Additionally, unlike the examples of FIGS. 4 and 5, in the illustrated example of FIG. 6 the magnets 212, 214 are unaligned or offset with respect to one another resulting in a greater distance between the magnets 212, 214 and, thus, a smaller magnetic force 310 to repel the top 204 away from the base 202 to maintain the gap 216 when the device 200 is resting in a closed position.

Other variations of the illustrated examples may also be implemented to satisfy particular design constraints for the device 200 and/or vary the strength of the magnetic force between the magnets 212, 214. For example, the alignment of the magnets 212, 214 in either of FIG. 4 or 5 may be offset to reduce the resulting magnetic force.

In some examples, each magnet 212, 214 comprises multiple permanent magnets arranged in a Halbach array such that the magnetic field is augmented on the side towards the gap 216 and reduced on the side away from the gap 216. Furthermore, in any of the examples disclosed herein, the magnets 212, 214 may be of any suitable arrangement, shape, and/or size.

FIG. 7 is a flowchart representing an example method implemented by the example portable electronic devices described in connection with FIGS. 1-5. Other methods may be implemented by the example portable electronic devices in addition to that which is disclosed herein. The example method involves maintaining a gap between a top and a base of a foldable electronic device resting in a closed position (block 400). The gap is maintained by a first magnet located in the base that repels a second magnet located in the top. In some examples, the first and second magnets may be placed in fixed locations within the corresponding base and top of the foldable electronic device. In some examples, maintaining the gap may be further assisted by a third magnet in the base that is oriented to attract a fourth magnet in the top to at least partially counteract the force of repulsion between the first and second magnets.

FIG. 8 is a flowchart representing an example method to manufacture the example portable electronic devices disclosed herein. For purposes of this disclosure, the example process is described primarily in connection with FIGS. 1-3. However, many other methods of manufacturing the example portable electronic devices disclosed herein may be employed. For example, the order of execution of certain blocks may be changed, and/or some of the blocks described may be changed, eliminated, sub-divided, or combined.

The example method of FIG. 5 begins at block 500 where a pair of magnets are selected to create a gap separating a top and a base of a portable electronic device when the device is resting in a closed position. Selecting the magnets includes determining the desired strength of the magnets based on the size, shape, orientation, and/or relative position of the magnets within the base and the top. The pair of magnets are inserted and arranged in the top and base of the device (block 502). A first magnet is inserted into the base and a second magnet is inserted into the top such that the first and second magnets are positioned to repel one another with a desired magnetic force to maintain the gap when the device is resting in a closed position. At block 504, the base and the top are connected via one or more hinges. In this manner, the top and the base can be folded together in clamshell-like fashion to close the portable electronic device. At block 506, it is determined whether additional pairs of magnets are selected for insertion in the device. If no additional pairs of magnets are selected, the method ends. However, if additional pairs of magnets are selected, the method advances to block 508 where the additional pairs of magnets are inserted and arranged in the top and the base. The additional magnets may be arranged to repel one another to assist the first pair of magnets in separating the top from the base, or they may be arranged so as to attract one another to provide a partially counteracting force to the first pair of magnets depending on design constraints of the device.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A foldable electronic device, comprising:
    a base;
    a cover;
    a hinge pivotally connecting the base and the cover to fold the device into a closed position;
    a first magnet in the base; and
    a second magnet in the cover to repel the first magnet to separate the base and the cover when the device is resting in the closed position, wherein the first magnet is immovably fixed in the base, and the second magnet is immovably fixed in the cover.

2. A foldable electronic device as defined in claim 1, further comprising:
    a keyboard in the base; and
    a display in the cover, the keyboard to face the display when the device is resting in the closed position.

3. A foldable electronic device as defined in claim 1, wherein the first and second magnets are positioned at edges of the base and cover located away from the hinge.

4. A foldable electronic device as defined in claim 1, wherein the first and second magnets are in juxtaposition when the device is resting in a closed position.

5. A foldable electronic device as defined in claim 1, wherein a strength of a repelling force between the first and second magnets is tuned to separate the cover and the base when the device is resting in the closed position, wherein the cover remains substantially parallel to the base when separated by the repelling force.

6. A foldable electronic device as defined in claim 1, wherein the positions of the first and second magnets are fixed within the corresponding base and cover.

7. A foldable electronic device as defined in claim 1, wherein at least one of the first or second magnets is at least one of a permanent magnet or an electromagnet.

8. A foldable electronic device, comprising:
    a base;
    a cover;
    a hinge pivotally connecting the base and the cover to fold the device into a closed position;
    a first magnet in the base;
    a second magnet in the cover to repel the first magnet to separate the base and the cover when the device is resting in the closed position, a strength of a repelling force between the first and second magnets is tuned to separate the cover and the base when the device is resting in the closed position, wherein the cover remains substantially parallel to the base when separated by the repelling force;
    a third magnet located in the base; and a fourth magnet located in the cover, the third and fourth magnets being oriented to create an attractive force to partially counteract the repelling force such that the cover and the base are separated when the device is resting in the closed position.

9. A foldable electronic device as defined in claim 8, wherein the first and second magnets are positioned at edges of the base and cover located away from the hinge.

10. A foldable electronic device as defined in claim 8, wherein the third and fourth magnets are positioned at edges of the base and cover located away from the hinge.

11. A foldable electronic device as defined in claim 8, wherein the first and second magnets are in juxtaposition when the device is resting in a closed position.

12. A portable electronic device, comprising;
a processor;
a base including a keyboard;
a top including a display, the top pivotally coupled to the base via a hinge;
a first magnet at a fixed location in the base and immovable relative to the base; and
a second magnet at a fixed location in the top and immovable relative to the top, the first and second magnets having same polarities positioned adjacent one another when the top is positioned adjacent the base.

13. A portable electronic device as defined in claim 12, wherein the first and second magnets are respectively disposed within the base and the top distal to the hinge.

14. A portable electronic device as defined in claim 12, wherein the first and second magnets have a combined repelling strength sufficient to maintain a gap between the base and the top.

15. A portable electronic device as defined in claim 14, wherein the gap has a substantially consistent width in a cross-sectional plane of the base.

16. A method comprising:
maintaining a gap between a top and a base of a foldable electronic device when the foldable electronic device is resting in a closed position with a first magnet in the base and a second magnet in the top, the first magnet to repel the second magnet, wherein the first magnet and the second magnets are in corresponding fixed locations within the top and base.

17. A method as defined in claim 16, wherein a third magnet in the top is to magnetically attract a fourth magnet in the base to at least partially counteract a repelling force between the first and second magnets.

* * * * *